Dec. 21, 1965    M. C. FERNANDEZ    3,225,350
AUTOMATIC SYSTEM FOR DETERMINING POINT OF ORIGIN
OF ANGULAR VALUES AT RESPECTIVE PLACES OF
MAPS USED IN NAVIGATION INDICATORS
Filed Jan. 4, 1963    5 Sheets-Sheet 3
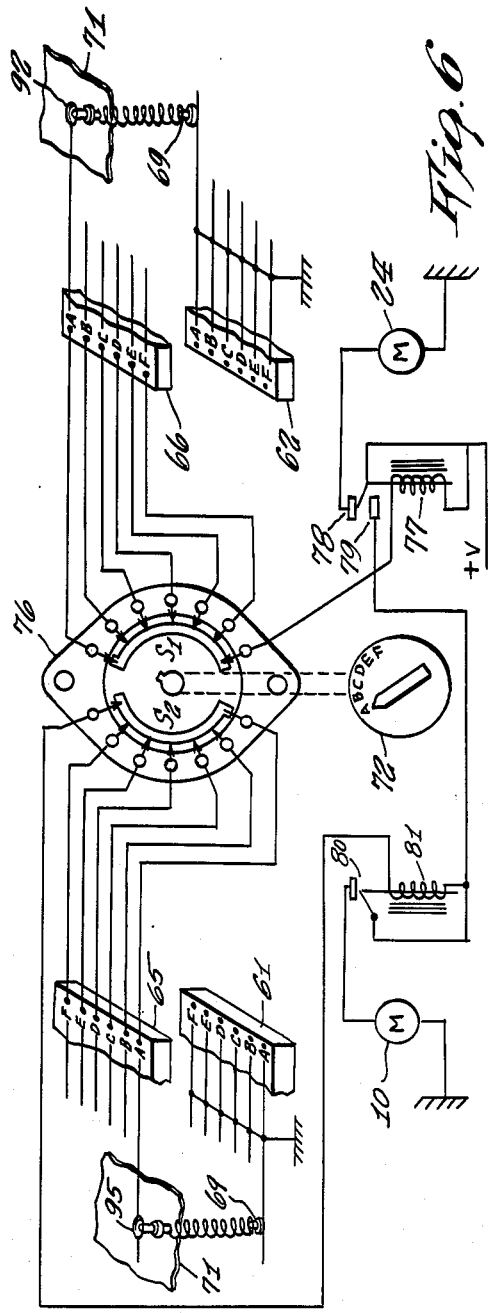
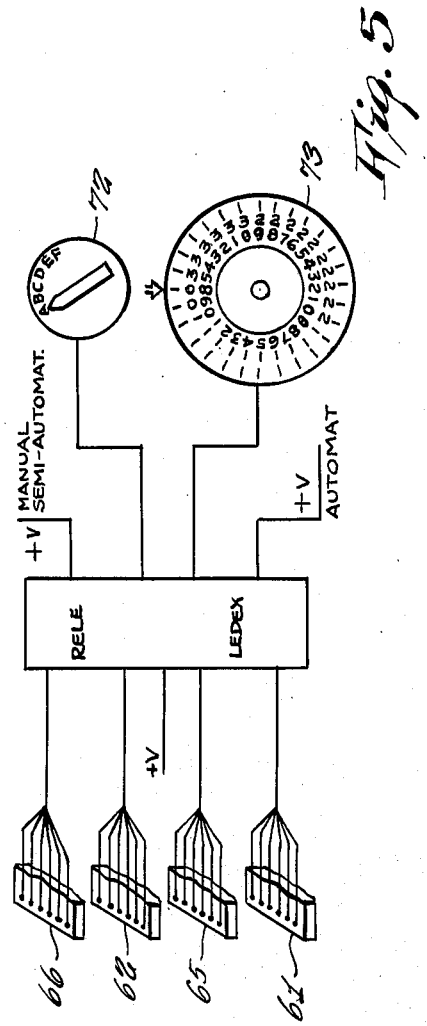
MANUEL CASTRO FERNANDEZ
INVENTOR.
BY
ATTORNEY Dec. 21, 1965    M. C. FERNANDEZ    3,225,350
AUTOMATIC SYSTEM FOR DETERMINING POINT OF ORIGIN
OF ANGULAR VALUES AT RESPECTIVE PLACES OF
MAPS USED IN NAVIGATION INDICATORS
Filed Jan. 4, 1963    5 Sheets-Sheet 4
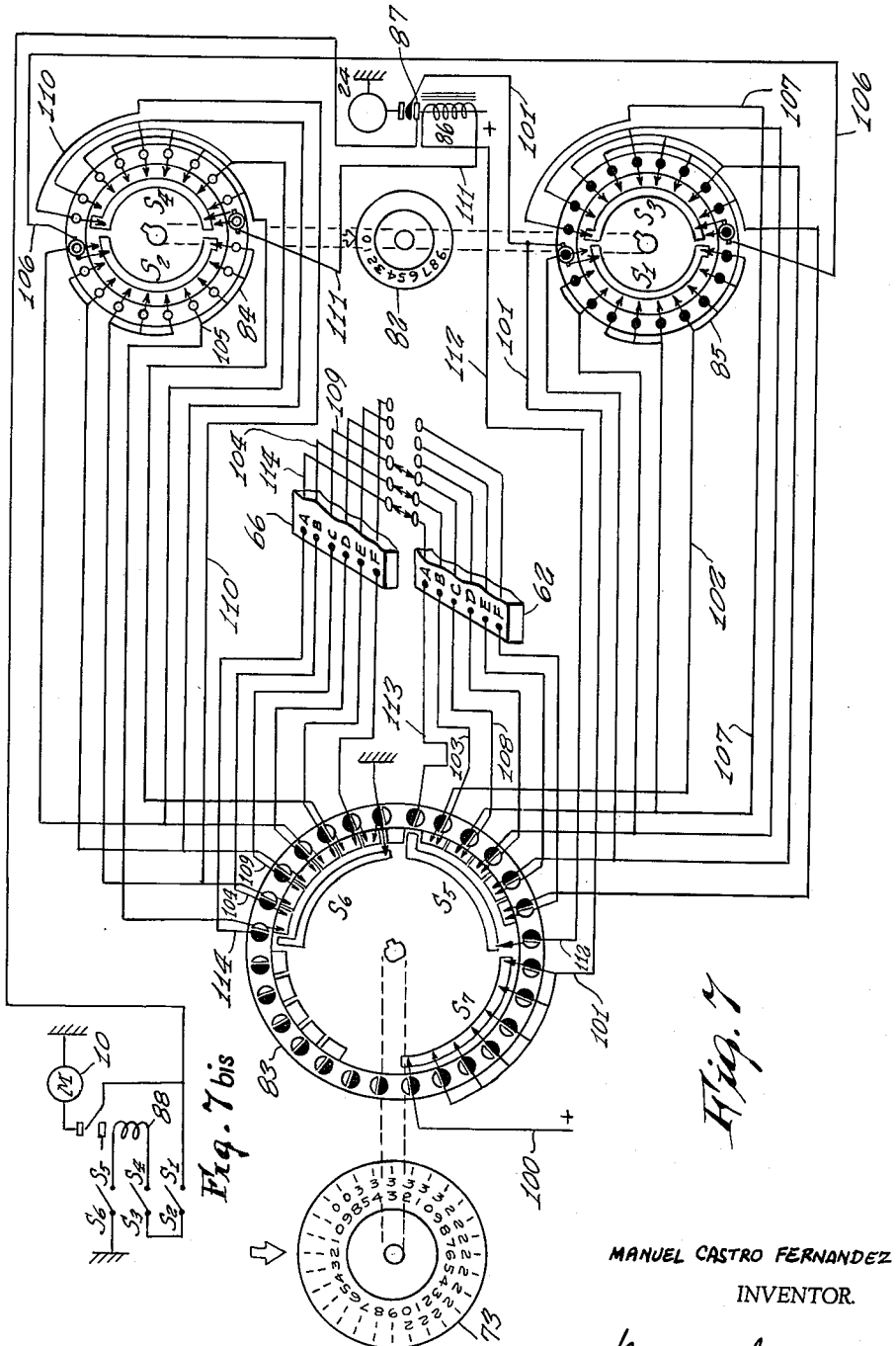
MANUEL CASTRO FERNANDEZ
INVENTOR.
BY
ATTORNEY

United States Patent Office 3,225,350
Patented Dec. 21, 1965

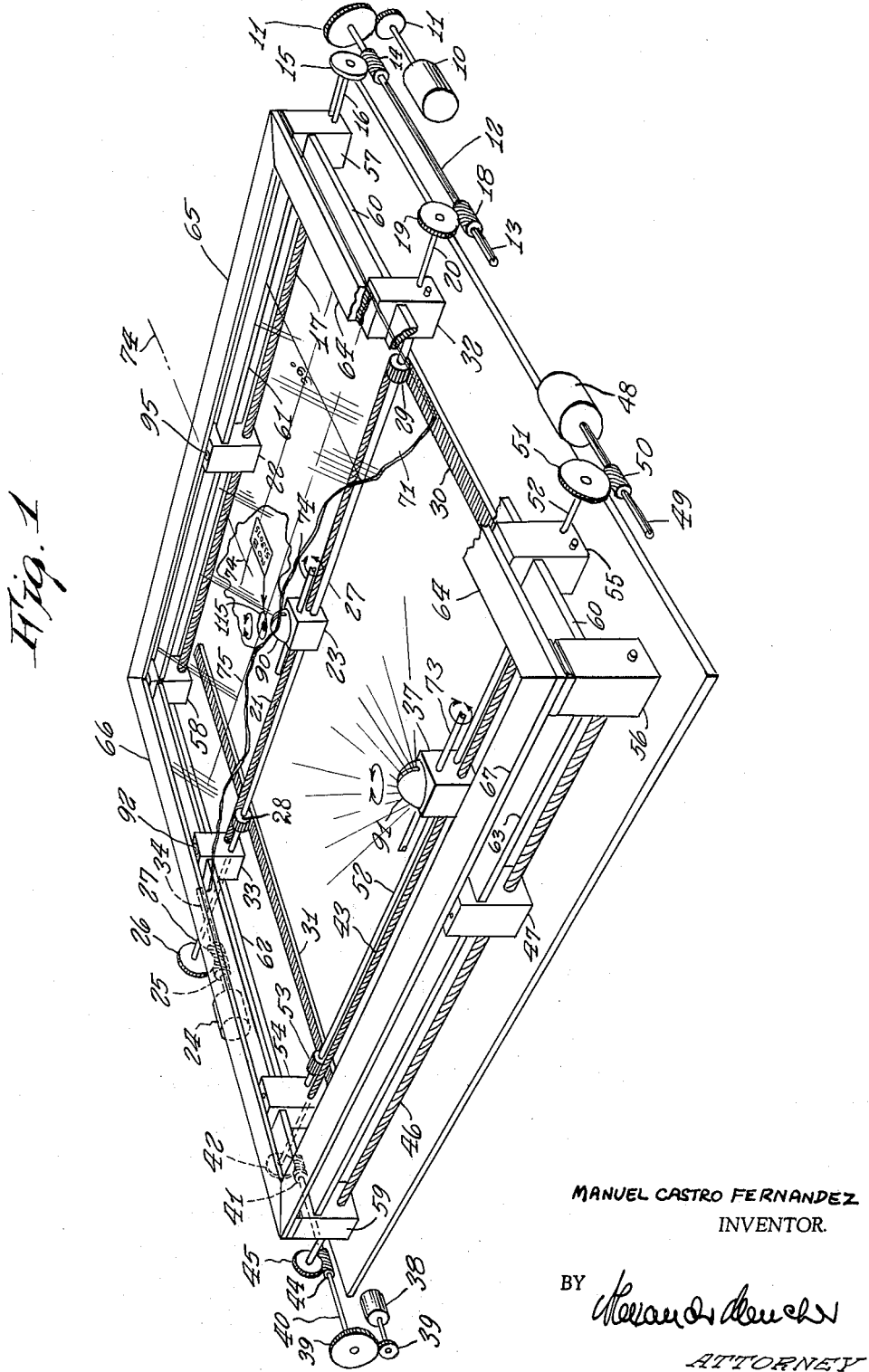

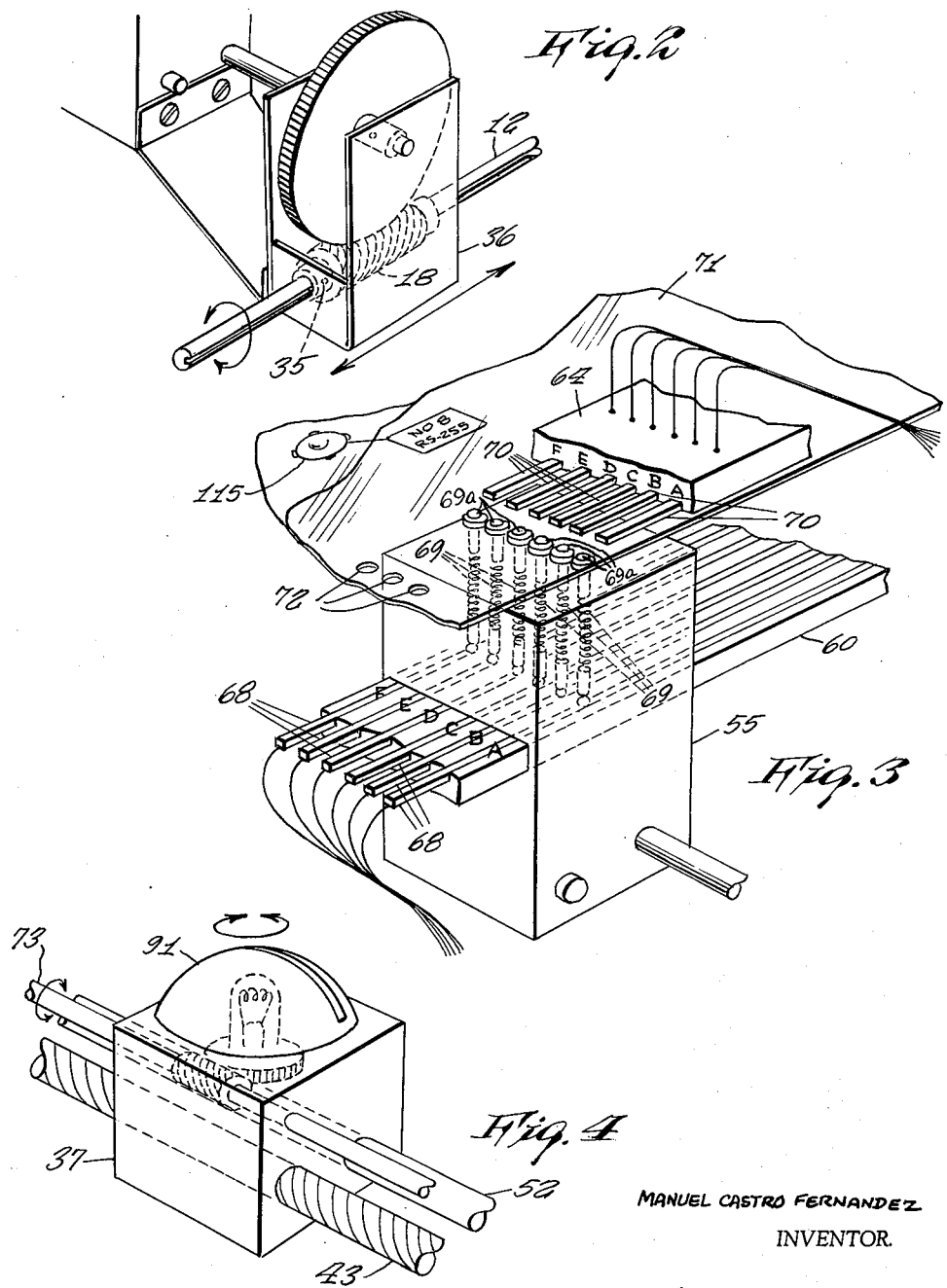

3,225,350
AUTOMATIC SYSTEM FOR DETERMINING POINT OF ORIGIN OF ANGULAR VALUES AT RESPECTIVE PLACES OF MAPS USED IN NAVIGATION INDICATORS
Manuel Castro Fernandez, Madrid, Spain, assignor of fifty percent to Carlos C. Goetz, Lisbon, Portugal
Filed Jan. 4, 1963, Ser. No. 249,488
9 Claims. (Cl. 343—112)

The high speed at which the latest planes travel has shown that the use of automatic position locating instruments for the moving object along a chart reproducing the terrain flown over, such as is accomplished with the aid of the equipment covered by U.S. Patents 3,009,147 and 3,136,998, lose some of their efficiency where the navigators find it necessary to switch maps manually, and even to a greater degree if the corrections pertaining to the new map likewise have to be carried out by the same procedure.

The system now in use, whereby the point of origin of the luminous beams or angular values is made to coincide with the position occupied on the map by the land-based radio stations employed for the purpose of determining the position of the moving object, is composed of a mechanical system which actuated manually, closes the displacement of the point of origin of the said luminous beams in directions which are mutually perpendicular, that is to say along horizontal and vertical movements with respect to the anterior part of the vessel's position locating instrument, causing it that way to coincide at any intended point of the map.

In actual practice, this method suffers from the inconvenience of slowness, and in some instances it is also subject to human error, and in order to resolve this problem, an electro-mechanical automatic system has been devised, one that can be readily applied to the said navigation computers.

The unit is composed of an electro-mechanical system which causes displacement of the supports of the point of origin of the luminous beams in horizontal and vertical directions with respect to the locating navigation instrument, as well as of an electrical switching system which regulates the said displacements.

The specifications below afford a detailed description of the apparatus employed which is one and the same regardless of whether resort is had to rolls of maps, or charts or maps manufactured in the form of single sheets.

FIG. 1 shows the electro-mechanical assembly employed for the purpose of starting in two directions of the support of the point of origin of the luminous beam.

FIGS. 2, 3 and 4 comprise partial components of the assembly shown in FIG. 1.

FIG. 5 shows a conventional switching system whereby the assembly (apparatus) is employed in connection with a semi-automatic or an automatic system.

FIG. 6 shows the distribution and the electrical function of the semi-automatic system.

FIG. 7 shows the automatic regulating system, while

Figure 8:
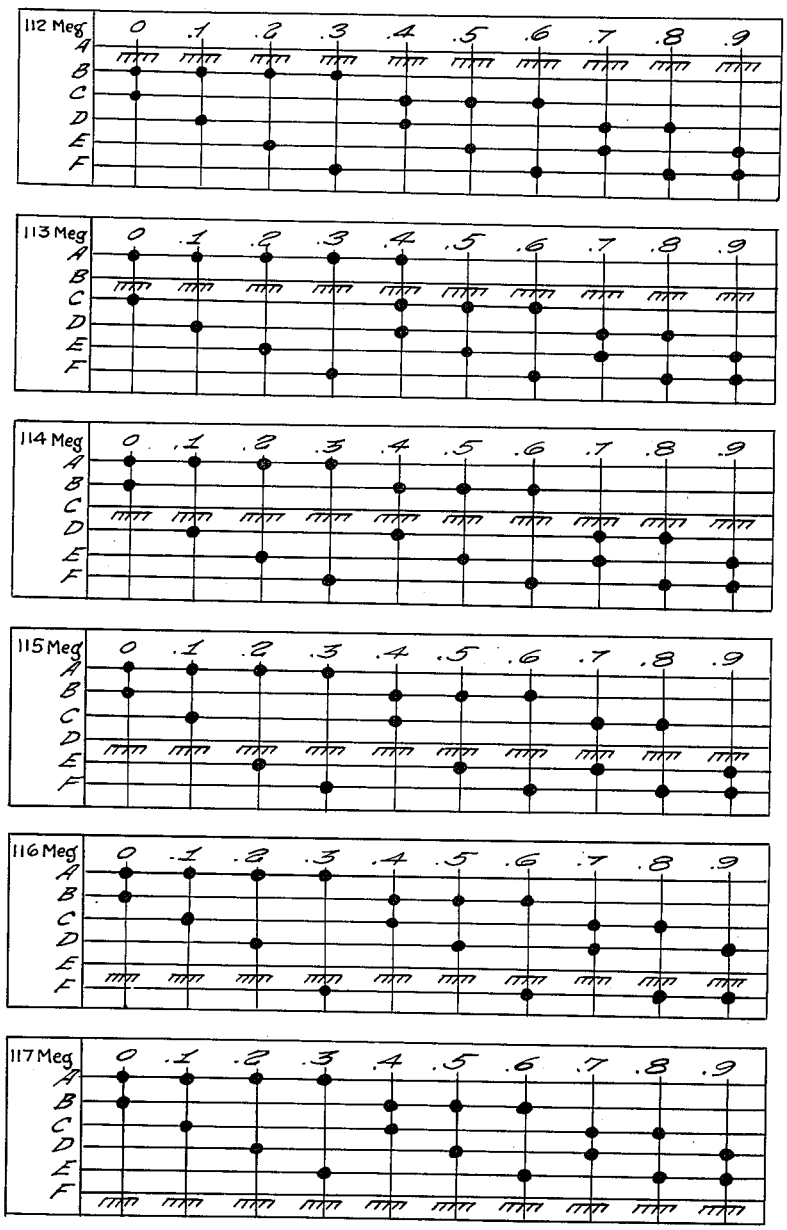
FIG. 8 shows the contact keys employed in the said automatic system.

To give a detailed description of FIG. 1 for the displacement of the support 23 whereon is mounted the point of origin of the right luminous beam, the drawing shows the motor 10 which by means of a reducing system 11 causes rotation of the shaft 12 which exhibits a groove 13 throughout the length of the same. Mounted on the shaft 12 is a fixed spindle 14 to which is coupled the wheel 15 which translates the action of the motor 10 to the shaft 16 representing an integral extension of the spindle 17. Another spindle 18 capable of displacement through the length of the shaft 12 has coupled to it the wheel 19 for the purpose of transmitting the action of the motor 10 to the shaft 20 which is an integral extension of the spindle 21.

If the spindles 14 and 18 are identical, and if the wheels 15 and 19 have the same diameter, the spindles 17 and 21 will rotate simultaneously and at the same speed of rotation, and if again the pitch of the thread of the said spindles 17 and 21 is the same, they will displace simultaneously over an equal lengthwise value and in the same vertical direction, the guide piece and support of contacts 22, and the supporting piece of the point of origin of the luminous beam 23, coupled respectively to the spindles 17 and 21.

The motor 24, which is also reversible, with or without demultiplication, has mounted on its grooved shaft 34 the displaceable spindle 25 which is coupled to the wheel 26 which is integral with the shaft 27 which by means of its fixed gears 28 and 29 and the toothed bases 30 and 31, brings about a horizontal displacement of the supporting piece 23 of the luminous point, and simultaneous with the guide piece 32 and the other guide piece and a contact base 33. This horizontal displacement to the left or to the right, depending on the rotation of the shaft 27, brings it about that the spindles 18 and 25 travel along the shafts 12 and 34, respectively.

FIG. 2 shows by means of an additional drawing, the key 35 and the supporting piece 36 which assure the normal travel of the spindle 18 along the shaft 12, thereby reproducing the rotation of the shaft 12 at any point thereof. Parts identical with the key 35 and the supporting piece 36 are employed in all spindles travelling along a shaft, as mentioned in the description of FIG. 1, and which are not shown in the drawing for greater clarity and simplicity of the chart.

The supporting piece 37 wherein is mounted the point of origin of the left luminous beam, travels vertically by means of the reversible motor 38 with or without a demultiplication system 39 which, as it rotates the grooved shaft 40 also entrains into rotation the displaceable spindle 41 indicated by means of the broken line, and which actuates the wheel 42 which is likewise shown by means of a broken line, for the purpose of transmitting its rotation to the spindle 43.

The spindle 44 which is fixed in the grooved shaft 40, actuates the wheel 45 which is integral with the spindle 46, thereby actuating by means of the rotation of the said spindle 46 vertically, the supporting piece for the contacts 47. The spindles 43 and 46 rotate simultaneously at the same rate of speed, and since parts 37 and 47 have the same thread pitch, they will travel simultaneously through the same lengthwise value.

The horizontal displacement of the supporting piece 37 is regulated by the action of the likewise reversible motor 48 which transmits the rotation of its grooved shaft 49 by means of the displaceable spindle 50 to the wheel 51 which is integral with the shaft 52. The said shaft 52 with fixed pinions 53 at its ends, displaces on rotation, the entire assembly including the guide piece 54, and the guide piece and support 55 of the contacts 69a, along the racks or toothed bases 30 and 31.

The right luminous beam system 90 mounted on the support 23 and the left luminous beam system 91 mounted on support 37, execute an angular rotation by means of the respective shafts 74 and 73, as described in U.S. Patent 3,136,998, for which reason no description thereof has been given in these specifications.

The columns 56, 57, 58, and 59 support the guide bars 60, 61, 62 and 63 which at the same time serve as contact bases along their upper surface as well as bars 64, 65, 66 and 67 which also serve at the same time as contact bases along their lower face. All of the guide bars and contact bases as well are along the upper surface of an identical construction, and similarly the bars which serve as contact bases along their nether face are of identical construction.

Mutually identical are likewise the supports of contacts 55 and 33, while also being identical with respect to their system of electro contacts, to the supports, with contacts 22 and 47 which are likewise mutually identical.

Shown in FIG. 3 in detail is the design of the guide bars and also of the contact bases as well as that of the supports with the contacts which are cited in the specifications.

The guide and contact base is along its upper surface 60 built of insulating material, with an incrustation thereon of six guide bars 68 designated as A, B, C, D, E, and F. Along this guide, slides the contact support 55, also made of insulating material, and accommodating in some holes provided along its upper part, six contacts 69a with a spring 69 which at the bottom come into frictional contact with the conductors 68 and at the top, with the conductors 70 lodged in the lower part of the contact base 64 which is also made of insulating material. When the map or chart 71 made of insulating and transparent plastic material, is introduced between the base of the contacts 64 and the support with the contacts 55, the conductors 70 remain insulated from the contacts 69. If the entire left system is displaced horizontally, contacts 69 get to coincide with the holes 72 provided in the map 71. On the introduction of the contacts 69a through the holes 72, the conductors 70 are short-circuited with their corresponding interiors 68, and at the point where these holes 72 have been provided on the map 71, they provide the necessary control for the points of origin of the luminous beams to halt, and remain positioned at the requisite point of the map.

The electrical system which controls the displacement of the assembly on the right, thereby also the point of anchorage on the map of the origin of the luminous beam, is identical with the system which controls the assembly on the left. Due to this fact, we shall confine ourselves in the description given below, to a single assembly or circuit, that is the one on the right.

As shown in FIG. 5, the conductors of the right control system, issuing from the guide bar, and simultaneously the contact base along the top 62 and from the contact base along the bottom 66, controlling in combination the horizontal movement, and the conductors issuing from the guidebar and simultaneously contact base for the upper part 61 and those of the contact base along the top 65 which also control in combination the vertical displacement of the system, are rooted to a distribution relay which may be identical with the relay known in aviation as the "Ledex" or multiple relay as described in Lockheed Report No. 8681-8, Section VIII, pages 8-26, very familiar in the art, and which shall therefore not be described, the said conductor to be connected as desired and by means of the said relay to a semi-automatic or automatic control system, coupling simultaneously the exact potentials required for the operation of the system thus employed.

When operating along the semi-automatic principle, each of the actuating systems, namely the right and the left, is capable of selecting up to six independent positions for the purpose of bringing about the coincidence of the point of origin of the luminous beam, with the point occupied on the map by the given land-based radio station. The said land-based radio stations 115 (FIG. 3) marked of the map 71 used in the navigating instrument, may belong to land-based radio transmission stations, radio-beacons or the like, transmitting by medium or long wave, the signals whereof are received aboard the vessel by means of directional receivers, known in aeronautical terminology as gonio or ADF receivers, or they may also belong to land-based radio transmitting stations for navigation at high frequency, received aboard the vessel by navigation instruments (receivers) known in aeronautics as VOR or TACAN systems.

When operating on a semi-automatic basis, each of the six stations capable of exploring the right tracking system, and each of the other six stations capable of being explored by the left tracking system, are provided with an index or letter which corresponds to the equivalent designation of the conductor bar which regulates the function of the tracking system, so that the luminous point should be situated along its vertical line, and this index or letter will coincide with the position of the pointer 72 of the selector (FIG. 6).

As shown in FIG. 1, along the edges of the chart of maps 71 and in the coordinate 75 of the point occupied by the transmitter, is to be found a hole 92 so devised that as the guide of the contacts 33 reaches that point, it is precisely contact 69a that passes the said hole 92 which contact corresponds to the bar A, the reading of which is identical with the one appearing on the map 71 alongside the given transmitter, and to the reading A which is marked by the pointer of the control drive 72 shown in FIG. 6.

When the conductor A of the upper bar 66 is short-circuited with the conductor A of the lower bar 62, the tracking system comes to a halt, owing to the characteristics of the electrical circuit shown in FIG. 6. The motor 24 which receives this potential by means of contact 78, operates so as to actuate horizontally the mechanical system, including the support of the contact guide 33, until in the course of its displacement the contact 69a encounters the hole 92 produced in the map 71, short circuiting the conductor A of the upper bar 66 with the conductor A of the lower bar 62. Since segment S1 of the switch 76 controls the grounding of the relay 77, the latter becomes energized, leaving the motor 24 without potential, whereupon the latter halts precisely after it has carried the mechanical system to the coordinate 75 of the given transmitter.

When the relay 77 becomes energized, the positive potential passes to contact 79 which feeds the motor 10 by way of contact 80. The action of the motor 10 drives the vertical system on the right until contact 69, which is seated in part 22 FIG. 1, encounters the hole 95 corresponding to coordinate 74 of the map 71, short-circuiting the conductor A of the upper bar 65 with the corresponding conductor A of the lower bar 61, which trips relay 81 which is grounded across the segment S2 of the switch 76.

The action of the relay 81 disconnects the potential from the motor 10 which causes the vertical exploration (scanning) system to halt at coordinate 74 of the transmitter, whereby the point of origin of the luminous beam 90 remains at the vertex of the two coordinates 74 and 75, which is the point of location on the map 71 of the selected station.

Conductors A, B, C, D, E, and F, of the guides 61 and 62 may all be grounded by means of the multiple relay system, as shown in FIG. 6, where resort is had to the semi-automatic system.

The selector drives 72 and 76 for the semi-automatic mode of operation, as well as the breaker of the multiple relay, may be accommodated in the same navigating instrument or in any distant or independent place.

When the stations utilized for the purpose of ascertaining the geographical position lines, are high-frequency, VOR type land-based stations, the aforesaid system may function in a completely automatic manner.

At the present time, the VOR type high-frequency stations, operate on a frequency ranging from 112.0 megacycles, to 117.9 megacycles, and on frequencies spaced between them by $1/10$ of a megacycle, so that no more than sixty different frequencies, covering the entire world service, are assigned to high-frequency, VOR navigation.

As stipulated in the foregoing, the mechanical tracking systems operate in two directions, namely horizontal and vertical. Each of these directions is actuated by a separate motor.

FIG. 7 shows the electrical distribution corresponding to one of these movements, and for the sake of greater clarity, in elucidating it, we will have is coincide with the horizontal work of the right tracking system shown in FIG. 1.

The conventional drives of VOR receivers, FIG. 7, comprise a reading disk 73 which gives the readings in megacycles, and a reading disk 82 which gives the readings in tenths of a megacycle, and mounted in one assembly, and the rotation of the said disks actuating the necessary switches for the tuning of the VOR receivers to the frequency of the given land-based radio transmitters. Independent of these tuning switches, but coupled to the rotary control shaft 73 giving the megacycles, is the switch 83 which is shown in the position of 112.0 megacycles.

Similarly, and coupled to the rotary shaft 82 showing the tenths of a megacycle, in the zero position, are switches 84 and 85. Any change in the number of positions of control 82 will correspond to a change in the same number of positions of switches 84 and 85.

Similarly, any change in the number of positions of control 73 will correspond to a change in the same number of positions of switch 83.

By means of segment S7 of switch 83, th automatic system is disconnected from its potential supply in any frequency not comprised between 112.0 megacycles and 117.9 megacycles, corresponding to the VOR navigational frequencies.

Where resort is had to this automatic system for the VOR, the map bears at its ends, and corresponding or otherwise to the given point of the map, three holes devised in accordance with the key shown in FIG. 8, and corresponding with the contact bars 68 and 70 marked with the letters A, B, C, D, E, and F.

This key is selected by means of the switch 83 which rotates simultaneously with the disk 73, and also by the action of the switches 84 and 85 which are simultaneously actuated by the disk 82, when the selection of the working frequency of the VOR receiver is carried out in disks 73 and 82.

As shown in FIG. 7, the selectors are positioned to work at a frequency of 112.0 megacycles, and in accordance with the key shown in FIG. 8, the contacts A, B, and C, should be responsible for halting the motor.

The contacts of the support 33 when travelling along the map 71, are insulated from the upper bar 66 by means of insulating material of this map 71, but if on the coordinate of a given point they encounter the proper holes, which in this care are those corresponding to conductors A, B, and C, they short-circuit the conductors of the lower bar 62 with the corresponding ones of the upper bar 66, tripping a relay which disconnects the feed of the motor 24 which causes the tracking (scanning) system to halt precisely on the level of that coordinate.

As shown in FIG. 7, the positive current entering via conductor 100 with the aid of contact S7 of the switch 83, flows to conductor 101 which conducts the current to the motor 24 which then begins to function. Simultaneously, conductor 101 is coupled by means of segment S1 of switch 85 to conductor 102 which by means of a bridge in segment S5 of the switch 83 is connected to the conductor 103 corresponding to contact B of the bar 62.

When the conductor B of the lower bar 62 becomes short-circuited, with conductor B of the upper bar 66, the current flows across the conductor 104 passing into conductor 105 by means of the bridge in segment S6 of the switch 83. Segment S2 of switch 84 channels this current to cable 106 which by means of segment S3 of switch 85 connects to a cable 107, which, in turn, via segment S5 of switch 83, channels it to contact C of the lower bar 62 by means of cable 108.

When contact C of the lower bar 62 is short-circuited with the contact C of the upper bar 66, the current flows to cable 109 which is connected to cable 110 by means of the bridge to be found on segment S6 of switch 83. The conductor 110 is connected by means of segment S4 of switch 84 to conductor 111 which conducts current to the positive part of the coil of relay 86.

The grounding to this relay 86 is accomplished by means of cable 112 which segment S5 of switch 83 connects to cable 113 corresponding to contact A of the lower bar 62.

When contact A of the lower bar 62 becomes short-circuited with contact A of the upper bar 66, the flow passes from cable 113 to 114, which by means of segment S6 of switch 83 becomes shunted to the ground, thereby actuating relay 86.

The response of relay 86 for motor 24 which actuates the horizontal tracking system, and in turn transfers the positive potential to the lower contact 87, so as to cause the operation of the similar vertical tracking system shown in FIG. 7b, which is actuated by the motor 10, the rotation of which will actuate the support of contacts 22 until the latter encounters the holes A, B, and C, devised in the map and at the end of the other coordinate of the point in question, whereby the relay 88 will close, causing stoppage of the motor 10, and the entire system coming to a halt.

The key selector system for the vertical movement is obtained by means of a system of contacts which is fully identical with the one shown in FIG. 7 for the horizontal system, so that FIG. 7b is only a schematic drawing.

The holes provided on the chart or map and described in this patent, can be substituted by metal-coated dots in the same chart or map, occupying the sites corresponding to the holes.

When, in the course of their displacement, the tracking systems reach the extreme upper end of the exploratory stroke on the map or chart, a simple system of current reversal in reversible motors which is well known to the art, and which is therefore not included or explained, will cause them to operate in the opposite direction.

I claim:

1. In an automatic system for positioning the point of origin of direction indicating means at a corresponding point of maps or charts employed in navigation instruments carried by air or water craft, a chart having said point of origin coinciding with the position of a land-based radio transmitter station marked with coordinates, said chart being made of electrically insulated material, each of said coordinates being provided with a hole, and drive means controlled by said holes to translate the point of origin of the direction indicating means which must occupy a position precisely at the point which in the said chart shows the location of the said land-based radio transmission station for the purpose of determining the point of origin of the direction indicating means by means of which the position of the craft is determined.

2. In an automatic system for positioning the point of origin of direction indicating means at a corresponding point of maps or charts employed in navigation instruments as defined in claim 1, characterized in that the holes provided near the ends of the coordinates are provided at different distances in each of the coordinates causing them to align the hole of each of the coordinates with the path of the drive means comprising a series of contacts and specifically a contact selected from said series of contacts so that as many different placements are found for the point of origin of the direction indicating means in said map or chart as there are contacts in the system.

3. In an automatic system for positioning the point of origin of direction indicating means at a corresponding point of maps or charts used in navigation instruments as defined in claim 2 wherein the hole provided in the coordinate of a point at which is marked the position of a land-based radio station is replaced by a constant number of holes provided in the same coordinates, key and electrical contact means to accomplish the separation between the said holes, said key relating the transmission frequency of the land-based radio transmitter with the contacts which must be selected and utilized from among all those contacts which go to make up the system, in order to control the drive means which translate the point of origin of the direction indicating means, and which must be situated precisely at the point where in the said chart or map is marked the location of the said land-based radio station employed for the purpose of obtaining the direction indicating means by means of which the position of the craft is determined.

4. In an automatic system for positioning the point of origin of direction indicating means at a corresponding point of maps or charts used in navigation instruments as set forth in claim 3 wherein a tuning control of a receiver is provided and other means so that the electrical contacts, which must be set into operation by way of holes provided in the coordinates of the place occupied on the map or chart by a land-based radio station, are selected simultaneously with the actuation of the position of the said tuning control of the receiver which receives the signal from the said land-based radio transmitter, the signal of which gives the direction indicating means, and the point of which is coincident with the position of said land-based radio station occupied on the chart or the map.

5. In an automatic system for determining the point of origin of direction indicating means at a corresponding point of maps or charts used in navigation instruments as set forth in claim 4 wherein the said chart or map provides for a number of different land-based radio stations, and wherein the position of the point of origin of the direction indicating means is transferred by the drive means until it occupies a fixed position at the point on the chart or the map at which the land-based radio station selected is situated, the operating frequency of which has been tuned for in the navigation receiver.

6. In an automatic system for determining the point of origin of direction indicating means at a corresponding point of the maps or charts used in navigation instruments as set forth in claim 1 having means whereby the drive means translate the point of origin of the direction indicating means in a given direction until the said point of origin of the direction indicating means takes up a position on one of the coordinates, actuating thereupon the mechanisms of said means in a direction perpendicular to the former, until it finds the other coordinate corresponding to the place where the land-based transmitter is situated in the chart or map, and which represents the position of the point of origin of the direction indicating means.

7. In an automatic system for positioning the point of origin of direction indicating means at a corresponding point of the maps or charts used in navigation indicators as set forth in claim 1 wherein holes provided on the coordinates of a point are provided in said coordinates providing that the point of origin of the direction indicating means is situated by drive means precisely on the intersection of said coordinates.

8. In an automatic system for positioning the point of origin of direction indicating means at a corresponding point of maps or charts employed in navigation instruments carried by air or water craft, a chart having said point of origin coinciding with the position of a land-based radio transmitter station marked with coordinates, said chart being made of electrically insulated material, each of asid coordinates being provided with a metal coated dot, and drive means controlled by said dots to translate the point of origin of the direction indicating means which must occupy a position precisely at the point which in the said chart shows the location of the said land-based radio transmission station for the purpose of determining the point of origin of the direction indicating means by means of which the position of the craft is determined.

9. In an automatic system for positioning the point of origin of direction indicating means at a corresponding point of the maps or charts used in navigation indicators as set forth in claim 8 wherein said metal-coated dots provided on the coordinates of a point are provided outside of said coordinates providing that the point of origin of the direction indicating means is situated by drive means precisely on the intersection of said coordinates.

References Cited by the Examiner
UNITED STATES PATENTS

| | | | |
|---|---|---|---|
| 2,637,848 | 5/1953 | Cunningham | 343—112 |
| 2,771,593 | 11/1956 | Straehl | 343—112 |
| 3,009,147 | 11/1961 | Fernandez | 343—112 |
| 3,113,313 | 12/1963 | Roberts | 343—112 |

CHESTER L. JUSTUS, *Primary Examiner.*